Sept. 27, 1960
K. D. SWANDER, JR
2,954,238
RAILWAY VEHICLE AIR SUSPENSION
Filed May 13, 1957
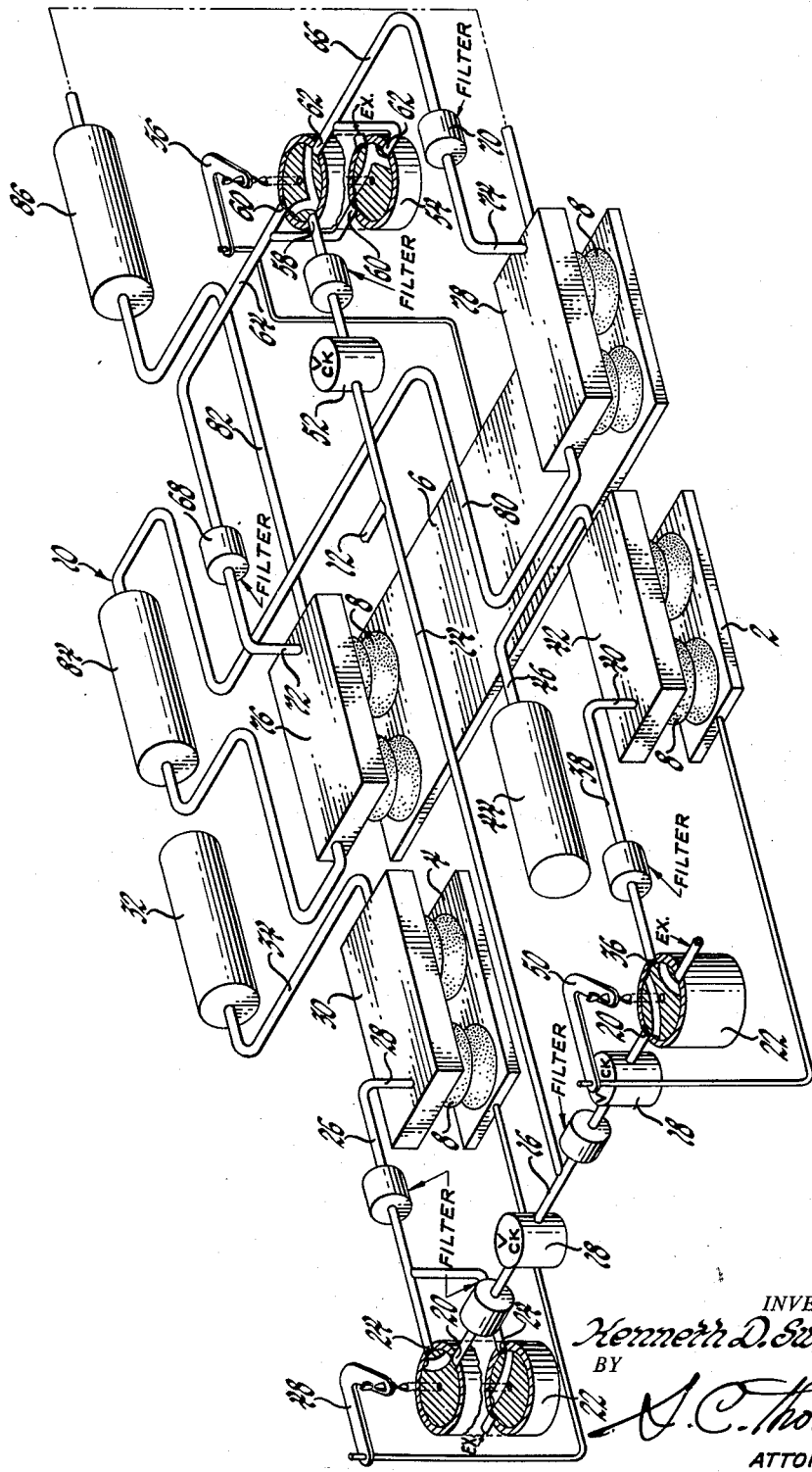
INVENTOR.
Kenneth D. Swander, Jr.
BY
J. C. Thorpe
ATTORNEY.

United States Patent Office 2,954,238
Patented Sept. 27, 1960

2,954,238

RAILWAY VEHICLE AIR SUSPENSION

Kenneth D. Swander, Jr., La Grange, Ill., assignor to General Motors Corporation, Detroit, Mich., a corporation of Delaware Filed May 13, 1957, Ser. No. 658,671

1 Claim. (Cl. 280—124)

This invention relates generally to vehicle suspensions and more particularly to fluid suspensions wherein a plurality of collapsible fluid containers connectable to a fluid pressure source are located at the four corners of the vehicle to resiliently support a sprung portion of the vehicle on unsprung portions thereof.

In the past it has been the practice to provide in suspensions of the kind emphasized above fluid springs at the four corners of the vehicle and to further provide leveling valve means for each of said springs individually responsive to the deflection between sprung and unsprung portions of the vehicle at the same general location as the spring associated therewith. One of the difficulties with such a system, however, particularly when used with railway vehicles, has been that if the vehicle is statically loaded, the load tends to be supported on diagonally located air springs and the suspension trims the load with the other diagonally located air springs. This results in air being exhausted from one of the latter diagonally located springs such that there is no load on that spring and as soon as the wheel strikes a bump or irregularity in the tracks sufficient to bounce it off the track, derailment occurs. No emphasis need be placed on the undesirability of such a condition.

The present invention is proposed to assure that there will be a load applied by the collapsible fluid containers to all of the wheels of the railway vehicle so that they are held firmly applied to the rails at all times. This has been accomplished by providing what is in effect a three-point suspension for the vehicle. This so-called three-point suspension is obtained by providing means allowing a continuous interchange of air between the fluid containing springs at one end of the vehicle and using the springs at the opposite end of the vehicle to trim the vehicle body.

For a better understanding of this invention and the objects thereof, reference may be had to the accompanying detailed description taken in conjunction with the accompanying drawing which represents a single schematic diagram of a vehicle including the novel fluid suspension.

Referring now to the drawing, a vehicle has unsprung parts thereof shown which are indicated by numerals 2, 4 and 6. The sprung portion of the vehicle, indicated by 10, constitutes the remaining structure shown except for four sets of fluid containing springs 8 which are located at the four corners of the vehicle and support the sprung portion 10 thereof on the unsprung portions 2, 4 and 6. There is an air pressure source on the vehicle, which in this instance is identified by numeral 12 and constitutes a fluid pressure conducting pipe normally having one end connected to a fluid compressor (not shown). Pipe 12, which as mentioned is assumed to constitute the air pressure source, is connected via a pipe 14 to a cross pipe 16 at what is taken in the present instance to be the forward end of the vehicle. Pipe 16 communicates via a pair of oppositely disposed check valves 18 with the inlets 20 of a pair of transversely located leveling valves 22. The upper leveling valve 22, as viewed in the drawing which corresponds to the front right corner of the vehicle, has its outlet 24 connected, via a pipe 26 including a filter so labeled and a pipe 28, to a reservoir 30 forming a part of the sprung body portion of the vehicle and in communication with the upper ends of the associated collapsible springs 8. The volume of reservoir 30 and collapsible springs 8 for the forward front corner of the vehicle is supplemented by means of a volume reservoir 32 connected to reservoir 30 by pipe 34. Similarly, the leveling valve 22 in the lower left hand corner of the diagram corresponds to the left front corner of the vehicle and has its outlet 36 connected, via piping 38 which includes a filter so labeled, and by pipe 40, to a reservoir 42 which also forms a part of the sprung body portion of the vehicle. Reservoir 42 communicates with the upper ends of collapsible springs 8 and its volume along with the volumes of spring 8 associated therewith is supplemented by a volume reservoir 44 connected thereto by pipe 46. The leveling valve 22 at the right front corner of the vehicle is connected by linkage 48 to the sunsprung portion 4 so as to be responsive to the deflection between sprung and unsprung portions of the vehicle at the right front corner of the vehicle to allow fluid pressure to flow from pipe 12 through pipes 14 and 16, check valve 18, leveling valve 22, pipes 26 and 28, into the fluid springs 8 when the deflection between sprung and unsprung portions is less than that for which the valve has been set to maintain. If, on the other hand, the deflection is greater than that for which the leveling valve has been set, some counterclockwise movement of the valve arm forming a part of linkage 48 will cause the outlet 24 of the valve to be connected to exhaust, so labeled, to thereby allow air to flow out of springs 8 and reservoir 30. Leveling valve 22 at the left front corner of the vehicle is responsive to the deflection between sprung portion 10 and unsprung portion 2 of the vehicle at the left front corner thereof and operates through linkage 50 in a manner similar to that described for the operation of leveling valve 22 at the right front corner to either maintain the fluid pressure in reservoir 42 and springs 8 or else increase or decrease this pressure in response to the deflection between the sprung and unsprung portions of the vehicle at the left front corner thereof.

Air pressure source 12 is also connected via pipe 14 through check valve 52 to a single leveling valve 54 located at the rear of the vehicle intermediate the transversely disposed sets of springs 8 at the rear of the vehicle. Leveling valve 54 is connected by operating linkage 56 to respond to the deflection between the unsprung portion 6 and sprung portion 10 of the vehicle intermediate the collapsible fluid springs 8 at the rear of the vehicle. Should the deflection be greater for that than for which the leveling valve has been set to maintain, leveling valve 54 will allow the flow of from air pressure source 12 through pipe 14 and check valve 52, the inlet 58 and outlets 60 and 62 to pipes 64, 66, including filters 68, 70, respectively, so labeled, and pipes 72 and 74 to reservoirs 76 and 78 corresponding to the rear right corner and rear left corner of the vehicle, respectively. The reservoir 76 as in the case of reservoirs 30 and 42 also forms a part of the sprung vehicle body portion and is in communication with the upper ends of springs 8 associated therewith. Reservoir 78 is a part of the sprung body portion of the vehicle and is in communication with the upper end of springs 8 associated therewith. The opposite ends of reservoirs 76 and 78 are connected together by piping 80 and 82 which include volume reservoirs 84 and 86 serving to increase the volume of compressible air associated with reservoirs 76 and 78 and springs 8 at the rear of the vehicle.

It should be emphasized at this point that the pipes 80 and 82 including reservoirs 84 and 86, respectively, allow a free interchange of air between the reservoirs 76 and 78 and the springs 8 associated therewith. By allowing this interchange of air between reservoirs 76 and 78 and the springs 8 associated therewith the rearward end of the vehicle will always be supported on both of the sets of springs 8 located at that end and the vehicle will be trimmed by the individual leveling valves located at the forward end of the vehicle. In this way the so-called three-point suspension is achieved which assures that the vehicle will be maintained level under static conditions and under all conditions of loading regardless of whether it is distributed on one side of the vehicle or the other, or at one end or the other, or a combination thereof. This further assures that all wheels of the vehicle, which are fixed to the unsprung portions 2, 4 and 6, will be firmly pressed to either the roadway or track, depending upon the type of vehicle involved, so that no derailment in the case of a railway vehicle is likely to occur.

I claim:

A fluid suspension between sprung and unsprung portions of a vehicle comprising a pair of transversely spaced collapsible fluid containers resiliently supporting one end of the vehicle sprung portion on an unsprung portion thereof, a fluid pressure source, a valve for each of said containers and responsive to deflection between sprung and unsprung portions of the vehicle in proximity to the container associated therewith to alternatively connect the associated container with said source or to exhaust to thereby maintain said deflection relatively constant through a range of loadings applied to the sprung portion, a second pair of transversely spaced collapsible fluid containers at the opposite end of the vehicle adapted to support the other end of the sprung portion on the unsprung portion, valve means responsive to deflection between the sprung and unsprung portions of said vehicle intermediate said second pair of containers and at said other end to alternatively connect said second pair of containers to said pressure source or to exhaust to maintain the deflection between said other end of the sprung and unsprung portions relatively constant over a range of loads applied to the sprung portion, and air conducting means connecting said second pair of containers together to allow free interchange of air therebetween, said air conducting means including fluid containing volume reservoirs to increase the volume of compressible fluid associated with said second pair of springs.

References Cited in the file of this patent

UNITED STATES PATENTS

| | | |
|---|---|---|
| 2,653,021 | Levy | Sept. 22, 1953 |
| 2,787,475 | Jackson | Apr. 2, 1957 |
| 2,882,068 | Faiver | Apr. 14, 1959 |

OTHER REFERENCES

Publication: SAE Journal, vol. 64, No. 1, March 1956, pages 54, 55.

Publication: Popular Science, January 1957, pages 124 to 128.